United States Patent Office 3,147,183
Patented Sept. 1, 1964

3,147,183
BIS-(STEROID-21)-DICARBOXYLIC ACID ESTERS
Joachim Heider and Dietrich Jerchel, Biberach an der Riss, Germany, assignors, by mesne assignments, to Boehringer Ingelheim G.m.b.H., Ingelheim (Rhine), Germany, a corporation of Germany
No Drawing. Filed Apr. 16, 1962, Ser. No. 187,947
8 Claims. (Cl. 167—58)

This invention relates to bis-(steroid-21)-dicarboxylic acid esters and to a process of preparing such esters.

More particularly, the present invention relates to bis-(steroid-21)-dicarboxylic acid esters of the formula

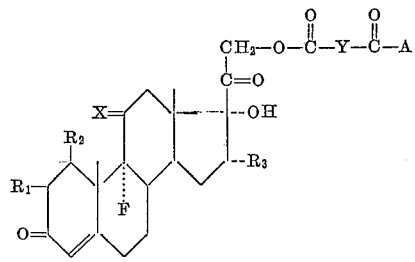

(I)

wherein A is a steroid-21 radical of a formula selected from the group consisting of

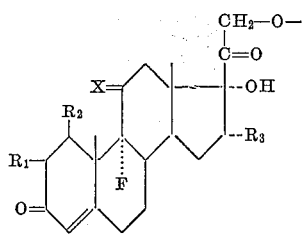

and

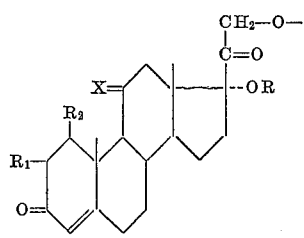

wherein

X is selected from the group consisting of oxygen and

R is selected from the group consisting of hydrogen and acyl of an organic carboxylic acid of 1 to 18 carbon atoms,
$R_1$ and $R_2$ are selected from the group consisting of hydrogen and, taken together, a double bond, and
$R_3$ is selected from the group consisting of hydrogen, hydroxyl and methyl, and
Y is selected from the group consisting of carbon-carbon bond, acyclic hydrocarbon chains of 1 to 6 carbon atoms, cycloalkylene, phenylene, lower alkyl phenylene and diphenylene.

The compounds of the invention, that is, those embraced by Formula I above, may be prepared by a number of known methods for preparing esters. However, the following methods have been found to be particularly advantageous:

Method A.—Reaction of 2 mols of a steroid alcohol of the formula

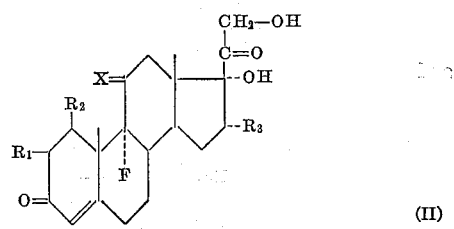

(II)

wherein $R_1$, $R_2$, $R_3$ and X have the meanings defined above in connection with Formula I, with one mol of a dicarboxylic acid dihalide of the formula

(III)

wherein Y has the meanings defined above in connection with Formula I and Hal is a halogen.

This reaction is preferably carried out at temperatures between —10 and +100° C. in the presence of an inert organic solvent, especially in the presence of pyridine, dioxane or dimethylformamide.

Method B.—Reaction of two mols of a steroid-21-halide of the formula

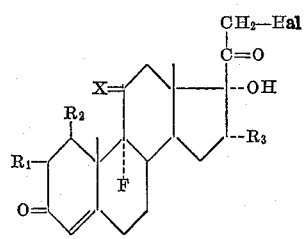

(IV)

wherein $R_1$, $R_2$, $R_3$ and X have the meanings previously defined in connection with Formula I and Hal is a halogen, with one mol of a carboxylic acid di-salt of the formula

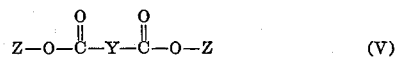

(V)

wherein Y has the meanings previously defined in connection with Formula I and Z is an alkali metal, alkaline earth metal or silver.

Method C.—Reaction of one mol of a salt of a dicarboxylic acid steroid-21 monoester of the formula

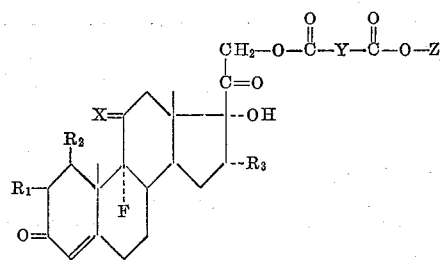

(VI)

wherein $R_1$, $R_2$, $R_3$, X and Z have the meanings previously defined, with one mol of a steroid-21-halide of a formula selected from the group consisting of

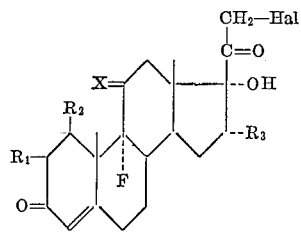

and

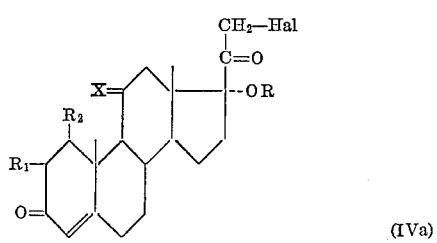

wherein R, $R_1$, $R_2$, $R_3$, X and Hal have the meanings defined above. This particular method is especially suitable for the preparation of compounds of the Formula I wherein the steroid moieties are different from each other.

*Method D.*—Reaction of a dicarboxylic acid dialkyl ester of the formula

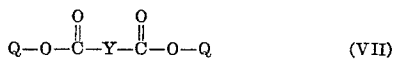

wherein Y has the meanings defined above and Q is a lower alkyl radical, with two mols of a 21-ol-steroid of the Formula II.

The 17α-acyl radical of the compounds of the invention is the acyl radical of an organic carboxylic acid having 1 to 18 carbon atoms. Suitable carboxylic acids are the alkanoic and alkenoic acids, such as acetic acid, trimethyl acetic acid, propionic acid, 4,4-dimethyl pentanoic acid, undecylenic acid; cycloalkyl alkanoic acids, such as phenyl propionic acid; cycloalkyl acids, such as hexahydrobenzoic acid and hexahydro-terephthalic acid; and phenyl carboxylic acids, such as benzoic acid or 3,5-dinitrobenzoic acid.

The dicarboxylic acids which are used to form the diesters are alkanoic and alkenoic dicarboxylic acids having 2 to 8 carbon atoms such as oxalic, succinic, methyl succinic, dimethyl succinic, allyl succinic, glutaric, adipic, pimelic and suberic acids; cycloalkyl dicarboxylic acids such as hexahydrophthalic acid; aryl dicarboxylic acids such as phthalic acid, tetrahydro-terephthalic acid and endomethylene-tetrahydro-terephthalic acid, isophthalic acid, terephthalic acid and diphenic acid.

The following examples illustrate several preferred embodiments of the invention. However, it should be understood that the invention is not intended to be limited to these specific embodiments. All melting points are determined by the Kofler block method.

EXAMPLE I

*Preparation of Bis-(Dexamethasone-21)-o-Phthalic Acid Ester by Method A*

A solution of 0.2 cc. of o-phthalic acid dichloride in 0.4 cc. of dioxane was added at a temperature of 10° C. to a solution of 1 gm. of dexamethasone in 4 cc. of pyridine. The resulting mixed solution was stirred for ten minutes at 10° C. and was then allowed to stand at 45° C. for four and one-half hours. Thereafter, the faintly colored reaction solution was poured into a mixture consisting of 24 cc. acetone, 4.5 cc. concentrated hydrochloric acid and 4.5 cc. water. The resulting mixture first turned cloudy and then a crystalline precipitate formed. The precipitate was filtered off and, in order to remove the small amount of semi-ester which was simultaneously formed, the filter cake was admixed with a small amount of acetone. The acetone was filtered off, yielding 0.62 gm. of bis-(dexamethasone-21)-o-phthalic acid ester of the formula

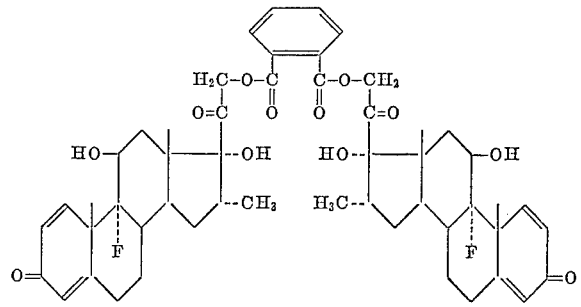

The product had a melting point (corrected) of 198.5–202° C. and a specific rotation $[\alpha]_{22}{}^D = +130°$ (methanol). It was found to be pure by thin-film chromatography.

EXAMPLE II

*Preparation of (9α-Fluoro-Hydrocortisone-21)-(Hydrocortisone-21)-o-Phthalic Acid Ester by Method C*

A solution of 0.2 gm. of the silver salt of (9α-fluoro-hydrocortisone-21)-o-phthalic acid semiester in 10 cc. of acetone was admixed with a solution of 0.15 gm. of 21-iodo-hydrocortisone in 3 cc. of 2,4,6-trimethyl pyridine (collidine), and the resulting mixed solution was refluxed for four and one-half hours. Thereafter, the reaction mixture was poured into ice water containing 2 cc. of hydrochloric acid, whereby a precipitate formed. The precipitate was filtered off. The filter cake was dissolved in a mixture of ethanol and acetone, leaving residual silver iodide as an insoluble residue. The silver iodide was filtered off and the filtrate was admixed with a large amount of water, whereby a precipitate formed. The white precipitate weighed 0.1 gm. and was identified to be (9α - fluoro - hydrocortisone - 21) - (hydrocortisone - 21)-o-phthalic acid ester of the formula

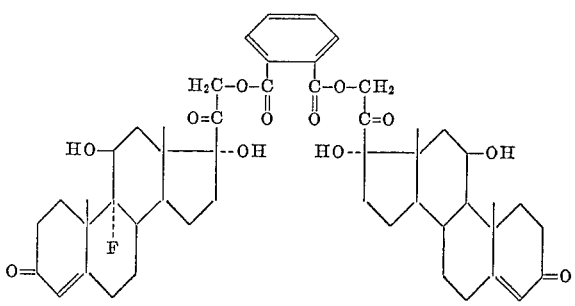

having a melting point (corrected) of 185.5° C. and a specific rotation $[\alpha]_{23}{}^D = +120°$ (acetone). The product was found to be pure by thin-film chromatography.

EXAMPLE III

*Preparation of Bis-(9α-Fluoro-Hydrocortisone-21)-o-Phthalic Acid Ester by Method C*

A solution of 0.2 gm. of the silver salt of (9α-fluoro-hydrocortisone-21)-o-phthalic acid semiester in 15 cc. of acetone was combined with a solution of 0.16 gm. of 9α-fluoro-21-iodo-hydrocortisone in 4 cc. of 2,4,6-trimethyl pyridine (collidine), and the resulting mixed solution was refluxed for three and one-half hours. Thereafter, the reaction solution was poured into ice water containing hydrochloric acid, whereby a precipitate formed which was separated by filtration and was dissolved in acetone. The acetone solution was treated with activated charcoal and was then admixed with a large amount of water, whereby the product was precipitated out again. The precipitate was separated and recrystallized from ethanol, yielding 0.22 gm. of a white crystalline substance which was identified to be bis-(9α-fluoro-hydrocortisone-21)-o-phthalic acid ester of the formula

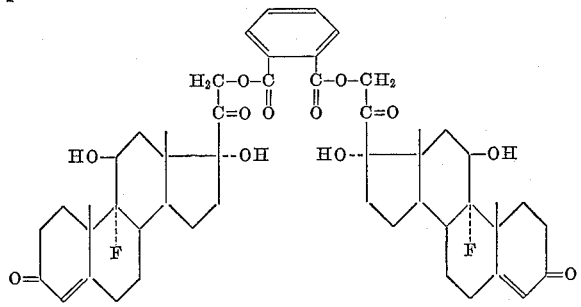

having a melting point (corrected) of 192° C. and a specific rotation [α]$_{25°}$$^D$=+111° (methanol).

The same compound was obtained when 9α-fluoro-hydrocortisone was reacted with o-phthalic acid dichloride in a manner analogous to that described in Example I.

EXAMPLE IV

*Preparation of Bis-(9α-Fluoro-Hydrocortistone-21)-Succinic Acid Ester by Method C*

A solution of 0.35 gm. of the silver salt of (9α-fluoro-hydrocortisone-21)-succinic acid semiester in 20 cc. of acetone was combined with a solution of 0.28 gm. of 9α-fluoro-21-iodo-hydrocortisone in 6 cc. of 2,4,6-trimethyl pyridine, and the resulting mixed solution was refluxed for two and one-half hours. Thereafter, the reaction mixture was poured into ice water containing hydrochloric acid, whereby a precipitate was formed which was separated by filtration and was dissolved in ethyl acetate. The resulting ethyl acetate solution was purified with activated charcoal, and then petroleum ether was added to re-precipitate the reaction product. The product weighed 0.15 gm. and was identified to be bis-(9α-fluoro-hydrocortisone-21)-succinic acid ester of the formula

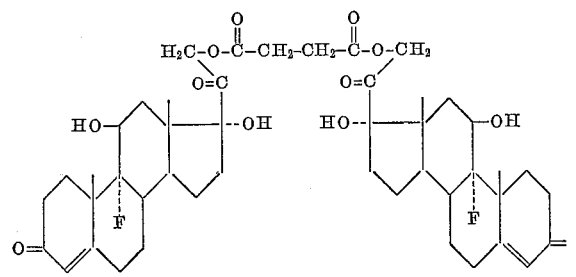

having a melting point (corrected) of 174–176° C. and a specific rotation [α]$_{23°}$$^D$=+134° (95% ethanol).

EXAMPLE V

*Preparation of (Cortisone-21)-(9α'-Fluoro-Hydrocortisone-21')-o-Phthalic Acid Ester by Method C*

Using a procedure analogous to that described in Example IV, the reaction of 0.15 gm. of the silver salt of (9α-fluoro-hydrocortisone-21)-o-phthalic acid semiester and 0.12 gm. of 21-iodo-cortisone yielded 0.07 gm. of (cortisone - 21) - (9α' - fluoro - hydrocortisone - 21') - o-phthalic acid ester of the formula

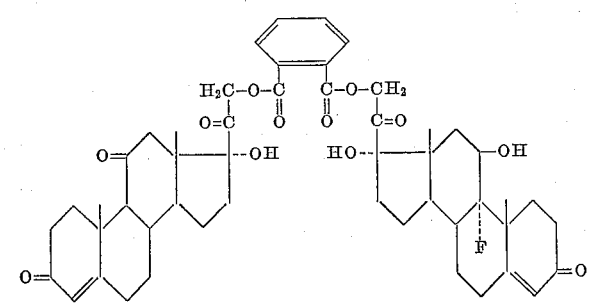

having a melting point (corrected) of 195–196.5° C. and a specific rotation [α]$_{22°}$$^D$=+130° (acetone).

The same compound was obtained when the silver salt of (cortisone-21)-o-phthalic acid semiester was reacted with 9α-fluoro-21-iodo-hydrocortisone.

EXAMPLE VI

*Preparation of (9α-Fluoro-16α-Hydroxy-Prednisolone-21)-(Hydrocortisone-21')-o-Phthalic Acid Ester by Method C*

Using a procedure analogous to that described in Example III, the reaction of 0.23 gm. of the silver salt of (9α - fluoro - 16α - hydroxy - prednisolone - 21) - o - phthalic acid semiester and 0.22 gm. of 21-iodo-hydrocortisone yielded 0.18 gm. of (9α-fluoro-16α-hydroxy-prednisolone-21)-(hydrocortisone-21')-o-phthalic acid ester of the formula

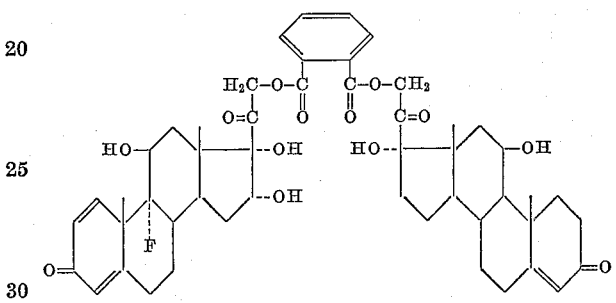

having a melting point (corrected) of 196–198° C. and a specific rotation [α]$_{22°}$$^D$=+62° (mixture of acetone and methanol in ratio 1:1).

EXAMPLE VII

*Preparation of (Dexamethasone-21)-(9'α-Fluoro-Hydrocortisone-21')-o-Phthalic Acid Ester by Method C*

Using a procedure analogous to that described in Example III, the reaction of 0.21 gm. of the silver salt of (dexamethasone-21)-o-phthalic acid semiester with 0.2 gm. of 9α-fluoro-21-iodo-hydrocortisone and recrystallization of the reaction product from a mixture of acetone and water and from a mixture of acetone, ether and petroleum ether yielded 0.08 gm. of (dexamethasone-21)-(9'α-fluoro-hydrocortisone-21')-o-phthalic acid ester of the formula

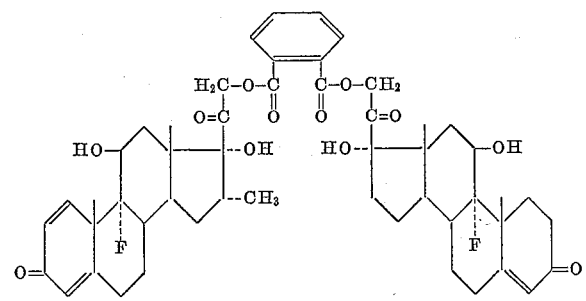

having a melting point (corrected) of 198–199.5° C. and a specific rotation [α]$_{23°}$$^D$=+110° (methanol).

The metal salts of the steroid-21-dicarboxylic acid semiesters used as starting materials in some of the above examples are prepared by the following known method:

EXAMPLE VIII

*Preparation of the Silver Salt of (Cortisone-21)-o-Phthalic Acid Semiester*

1.5 gm. of cortisone and 2.5 gm. (4.0 mols) of phthalic acid anhydride were added to a mixture of 6 cc. of pyridine and 8 cc. of dioxane, and the resulting mixture was heated at a temperature of 85° C. for four hours. Thereafter, the reaction solution was poured into ice water containing hydrochloric acid, whereby a precipitate was formed. The precipitate was extracted with hot water to remove residual phthalic acid anhydride. The residue was recrystallized from a mixture of equal parts of acetone and water, yielding 1.35 gm. of (cortisone-21)-o-phthalic acid semiester of the formula

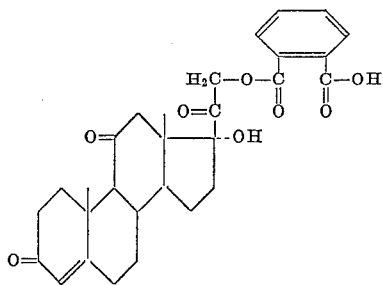

having a melting point of 148–149° C. (decomposition).

1 gm. of this (cortisone-21-)-o-phthalic acid semiester was dissolved in 20 cc. of methanol, and the resulting solution was combined with a solution of 0.08 gm. of sodium hydroxide in 3 cc. of methanol. The combined solution was admixed with ether, whereby 0.8 gm. of the sodium salt of (cortisone-21)-o-phthalic acid semiester of the formula

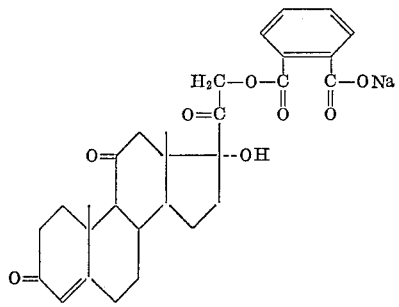

was precipitated out.

0.6 gm. of the sodium salt was dissolved in 15 cc. of methanol, and the resulting solution was admixed with a solution of 0.2 gm. of silver nitrate in 3 cc. of water. 0.55 gm. of a sand-colored precipitate formed, which was separated and identified as the silver salt of (cortisone-21)-o-phthalic acid semiester of the formula

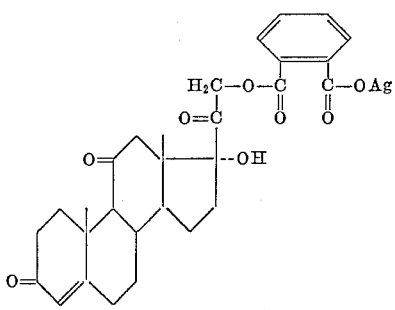

having a melting point of 168–173° C. (decomposition).

In like manner, the following silver salts of (steroid-21)-dicarboxylic acid semiesters were prepared:

(1) Silver salt of (9α-fluoro-16α-hydroxy-prednisolone-21)-o-phthalic acid semiester;
(2) Silver salt of (9α-fluoro-hydrocortisone-21)-o-phthalic acid semiester;
(3) Silver salt of (9α-fluoro-hydrocortisone-21)-succinic acid semiester;
(4) Silver salt of (dexamethasone-21)-o-phthalic acid semiester.

The bis-(steroid-21)-dicarboxylic acid esters according to the present invention, that is, the compounds embraced by Formula I above, have useful pharmacodynamic properties. More particularly, the compounds of the present invention exhibit highly effective antiphlogistic properties which are especially suitable for external dermatological use. For external application of the bis-(steroid-21)-dicarboxylic acid esters of the present invention are advantageously incorporated in amounts from 0.01 to 0.1 percent of weight into a carrier composition adapted to be applied to the skin, for example into an ointment base, a creme base, a tincture solution, a lotion, an aerosol spray or the like. If desired, the antiphlogistic dermatological composition may, in addition to the compounds of the present invention, also comprise an anti-bacterial component, such as hexachlorophene.

The following examples illustrate various typical external dermatological compositions comprising the bis-(steroid-21-)-dicarboxylic acid esters of the present invention as antiphlogistic ingredients. The parts are parts by weight.

EXAMPLE IX

*Ointment (Water-in-Fat Emulsion)*

The antiphlogistic ointment composition is compounded from the following ingredients:

| | Parts |
|---|---|
| Bis-(dexamethasone-21)-o-phthalic acid ester | 0.02 |
| Distilled water | 20.00 |
| Wool grease alcohols | 5.00 |
| Paraffin, liquid | 20.00 |
| Vaseline | 54.98 |
| Total | 100.00 |

*Compounding procedure.*—The wool grease alcohols, the paraffin and the vaseline are admixed with each other and the resulting mixture is heated at 70° C. until the wool grease alcohols have melted. The distilled water is heated to 70° C. and is added to the molten fat mixture. The resulting composition is stirred until cool; it constitutes the ointment base. The steroid ester is micronized and is then thoroughly blended into a small portion of the ointment base. This composition is finally uniformly admixed with the remainder of the ointment base. The finished ointment composition is then rolled.

EXAMPLE X

*Creme (Fat-in-Water Emulsion With Low Fat Content)*

The antiphlogistic creme composition is compounded from the following ingredients:

| | Parts |
|---|---|
| Bis-(dexamethasone-21-)-o-phthalic acid ester | 0.02 |
| Isopropyl myristate | 5.00 |
| Cetyl alcohol | 5.00 |
| Glycerin monostearate | 6.00 |
| Polyoxyethylene-sorbitan-monostearate ("Tween 60") | 4.00 |
| p-Hydroxy-benzoic acid methyl ester | 0.10 |
| Distilled water | 79.88 |
| Total | 100.00 |

*Compounding procedure.*—The isopropyl myristate, the cetyl alcohol, the glycerin monostearate and the polyoxyethylene-sorbitan-monostearate are admixed with each other and the mixture is melted. The molten mass is then emulsified with a solution of the p-hydroxy-benzoic acid methyl ester in the distilled water at 70° C. The resulting composition is stirred until cold; it constitutes the creme base. The steroid ester is micronized and is then thoroughly blended into a small portion of the creme base. The remaining amount of creme base is then added and the finished creme composition is rolled.

EXAMPLE XI

*Tincture (With Hexachlorophene)*

The antiphlogistic tincture is compounded from the following ingredients:

|  | Parts |
|---|---|
| Bis-(dexamethasone-21)-o-phthalic acid ester | 0.02 |
| Hexachlorophene | 0.50 |
| Ethyl alcohol | 65.00 |
| Perfume | 0.20 |
| Distilled water | 34.28 |
| Total | 100.00 |

*Compounding procedure.*—The steroid ester, the hexachlorophene and the perfume are successively dissolved in the ethanol, accompanied by stirring. Thereafter, the distilled water is stirred into the alcohol solution. The finished tincture is then filtered until fiber-free.

EXAMPLE XII

*Lotion*

The antiphlogistic lotion is compounded from the following ingredients:

|  | Parts |
|---|---|
| Bis-(dexamethasone-21)-o-phthalic acid ester | 0.01 |
| Cetyl stearyl alcohol, self-emulsifying [1] | 2.50 |
| p-Hydroxy-benzoic acid methyl ester | 0.10 |
| Glycerin | 4.00 |
| Distilled water | 91.39 |
| Isopropyl myristate | 2.00 |
| Total | 100.00 |

[1] "Lanette N," a product of Deutsche Hydrierwerke, Dusseldorf, Germany.

*Compounding procedure.*—The cetyl stearyl alcohol and the isopropyl myristate are admixed and the mixture is melted and maintained at 70° C. The p-hydroxybenzoic acid methyl ester is dissolved in the hot distilled water, the glycerin is added thereto, and this solution is heated to 70° C. The hot molten mixture of cetyl stearyl alcohol and isopropyl myristate is then emulsified into the aqueous glycerin solution at 70° C., and the emulsion is stirred until cold. This composition constitutes the lotion base. The steroid ester is micronized and is blended into a small portion of the lotion base. The resulting mixture is finally uniformly admixed with the remaining amount of the lotion base.

EXAMPLE XIII

*Aerosol Spray*

The antiphlogistic aerosol spray is compounded from the following ingredients:

|  | Parts |
|---|---|
| Bis-(dexamethasone-21)-o-phthalic acid ester | 0.01 |
| Isopropyl myristate | 1.50 |
| Perfume | 0.10 |
| Ethyl alcohol | 30.00 |
| Isopropyl alcohol | 38.39 |
| Difluoro-dichloro-methane | 30.00 |
| Total | 100.00 |

*Compounding procedure.*—A mixture of the ethyl alcohol and the isopropyl alcohol is prepared, and then the steroid ester, the isopropyl myristate and the perfume are dissolved in the alcohol mixture, accompanied by stirring. The resulting solution is then admixed under customary conditions with the difluoro-dichloro-methane propellant, and the composition is filled into suitable spray cans either under deep refrigeration or under pressure.

While we have illustrated our invention with the aid of certain specific embodiments, it will be readily apparent to others skilled in the art that our invention is not limited to these specific embodiments and that various changes and modifications may be introduced without departing from the spirit of the invention or the scope of the appended claims.

We claim:
1. A bis-(steroid-21)-dicarboxylic acid ester of the formula

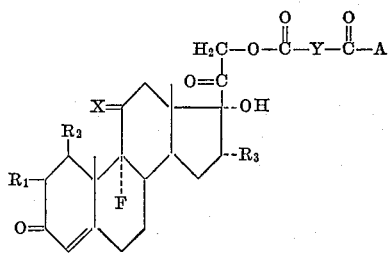

wherein A is a steroid-21 radical of a formula selected from the group consisting of

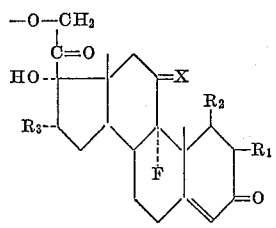

and

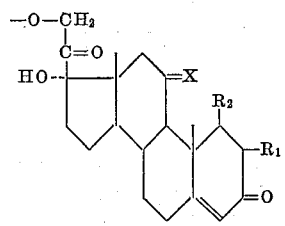

where
X is selected from the group consisting of oxygen and

$R_1$ and $R_2$ are selected from the group consisting of hydrogen and, taken together, a double bond,
$R_3$ is selected from the group consisting of hydrogen, hydroxyl and methyl,
and Y is selected from the group consisting of carbon-carbon bond, acyclic hydrocarbon chains of 1 to 6 carbon atoms, cycloalkylene, phenylene, lower alkyl phenylene and diphenylene.

2. Bis-(dexamethasone-21)-o-phthalic acid ester.
3. (9α - fluoro - hydrocortisone - 21) - (hydrocortisone-21′)-o-phthalic acid ester.
4. Bis - (9α - fluoro - hydrocortisone - 21) - o - phthalic acid ester.
5. Bis - (9α - fluoro - hydrocortisone - 21) - succinic acid ester.
6. (Dexamethasone 21) - (9′α - fluoro - hydrocortisone-21′)-o-phthalic acid ester.
7. An antiphlogistic dermatological composition consisting essentially of a physiologically compatible carrier having uniformly distributed therein 0.01 to 0.1 percent of weight of a bis-(steroid-21)-dicarboxylic acid ester of the formula

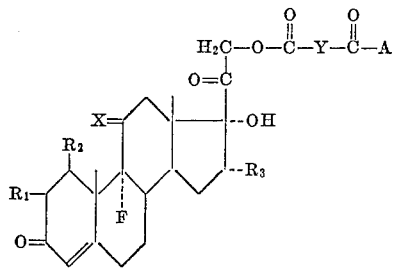

wherein A is a steroid-21 radical of a formula selected from the group consisting of

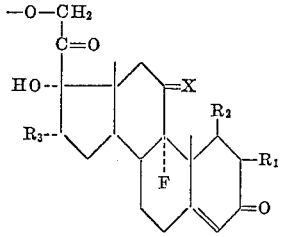

and

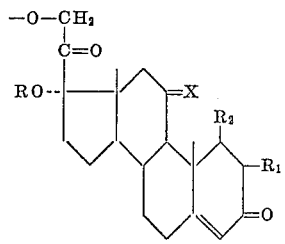

where
X is selected from the group consisting of oxygen and

R is selected form the group consisting of hydrogen and acyl of an organic carboxylic acid of 1 to 18 carbon atoms,
$R_1$ and $R_2$ are selected from the group consisting of hydrogen and, taken together, a double bond, and
$R_3$ is selected from the group consisting of hydrogen, hydroxyl and methyl,
and Y is selected from the group consisting of carbon-carbon bond, acyclic hydrocarbon chains of 1 to 6 carbon atoms, cycloalkylene, phenylene, lower alkyl phenylene and diphenylene.

8. The method of counteracting inflammation in warm-blooded animals which comprises contacting the inflamed area with a bis-(steroid-21)-dicarboxylic acid ester of the formula

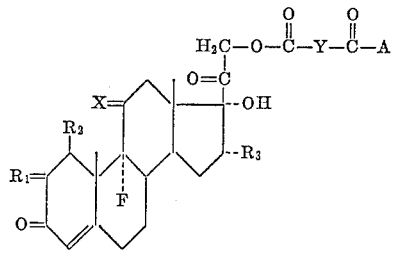

wherein A is a steroid-21 radical of a formula selected from the group consisting of

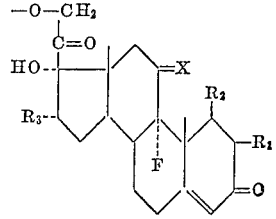

and

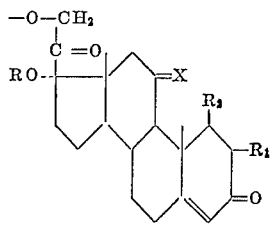

where
X is selected from the group consisting of oxygen and

R is selected from the group consisting of hydrogen and acyl of an organic carboxylic acid of 1 to 18 carbon atoms,
$R_1$ and $R_2$ are selected from the group consisting of hydrogen and, taken together, a double bond, and
$R_3$ is selected from the group consisting of hydrogen, hydroxyl and methyl,
and Y is selected from the group consisting of carbon-carbon bond, acyclic hydrocarbon chains of 1 to 6 carbon atoms, cycloalkylene, phenylene, lower alkyl phenylene and diphenylene.

No references cited.